(12) United States Patent
Jansen et al.

(10) Patent No.: US 8,357,313 B2
(45) Date of Patent: Jan. 22, 2013

(54) LUMINESCENT SUBSTANCES

(75) Inventors: Martin Jansen, Leonberg (DE); Hasan Cakmak, Stuttgart (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 469 days.

(21) Appl. No.: 12/513,449

(22) PCT Filed: Oct. 31, 2007

(86) PCT No.: PCT/EP2007/009470
§ 371 (c)(1),
(2), (4) Date: May 4, 2009

(87) PCT Pub. No.: WO2008/052771
PCT Pub. Date: May 8, 2008

(65) Prior Publication Data
US 2010/0012897 A1 Jan. 21, 2010

(30) Foreign Application Priority Data
Nov. 2, 2006 (DE) .......... 10 2006 051 757

(51) Int. Cl.
*C09K 11/77* (2006.01)
*C04B 35/584* (2006.01)
(52) U.S. Cl. .... 252/301.4 F; 252/301.4 P; 252/301.4 R; 501/40; 501/47; 501/48; 501/52; 501/96.2; 501/96.1; 501/96.5; 501/152
(58) Field of Classification Search ........... 252/301.4 R, 252/301.4 F, 301.4 P, 301.6 R, 301.6 P, 301.6 F; 501/40, 47, 48, 52, 96.2, 96.1, 96.5
See application file for complete search history.

(56) References Cited

U.S. PATENT DOCUMENTS

| | | | | |
|---|---|---|---|---|
| 5,233,066 A | * | 8/1993 | Jansen et al. ............ | 556/402 |
| 5,405,982 A | * | 4/1995 | Loffelholz et al. ....... | 556/173 |
| 6,717,355 B2 | * | 4/2004 | Takahashi et al. ........ | 313/503 |

FOREIGN PATENT DOCUMENTS

| | | |
|---|---|---|
| DE | 195 30 390 A1 | 2/1997 |
| EP | 1223208 A1 | 7/2002 |
| EP | 1 696 016 A1 | 8/2006 |
| WO | 02/22624 A1 | 3/2002 |
| WO | 2005/049763 A1 | 6/2005 |

OTHER PUBLICATIONS

Baldus et al, "Novel High-Performance Ceramic-Amorphous Inorganic Networks from Molecular Precursors", Angew. Chem, Int. Ed. Engl. 1997, 36, pp. 328-343.*
Baldus et al., 2003, "Novel High-Performance Ceramics—Amorphous Inorganic Networks from Molecular Precursors," Angewandte Chemie, 36(4):328-343.
PCT International Search Report for PCT/EP2007/009470 dated Jan. 2, 2008 (4 pages).

* cited by examiner

*Primary Examiner* — Carol M Koslow
(74) *Attorney, Agent, or Firm* — Sutherland Asbill & Brennan LLP

(57) ABSTRACT

The invention relates to a new class of luminescent substances (phosphorous) based on an universally dopable matrix made of an amorphous, at the most partially crystalline network of the elements P, Si, B, Al and N, preferably the composition $Si_3B_3N_7$. Optical excitation and emission can be varied in this system over the entire practically relevant field by incorporation of any cationic activators, alone or in combination, but also by incorporation of oxygen as anionic component. This opens up the entire spectrum of use of luminescent substances, such as illumination systems or electronic screens.

20 Claims, No Drawings

LUMINESCENT SUBSTANCES

CROSS REFERENCES TO RELATED APPLICATIONS

This application claims the priority benefit of PCT/EP2007/009470 filed on Oct. 31, 2007 and German Application No. 10 2006 051 757.1 filed on Nov. 2, 2006. The entire contents of these applications are hereby incorporated in their entirety.

BACKGROUND

The invention relates to a novel class of luminophores (phosphors) based on a universally dopable matrix composed of an amorphous, at most partly crystalline network composed of the elements P, Si, B, Al and N, preferably of the composition $Si_3B_3N_7$. Optical excitation and emission in this system can be varied over the entire practically relevant range by incorporating any cationic activators, individually or in combination, but also by incorporating oxygen as an anionic component. This opens up the entire spectrum of application for luminophores, for instance for illumination systems or electronic visual display units.

SUMMARY OF THE INVENTION

Luminophores based on oxo- and/or nitridosilicates, -phosphates or -aluminates as the host lattice, doped with transition metals or lanthanoids as the activator, are described in many different variants. The requirements on the luminophores to be provided are growing constantly, especially because new applications have been opened up by new illumination and visual display unit technologies over and above the conventional fields of use such as cathode array visual display units (Brown tubes) or gas discharge lamps. Since blue LEDs (e.g. GaN or $Ga_{1-x}In_xN$) have become available, considerable efforts have been made to adjust their emissions to the desired application, such as color of the emission, by coating with one or more luminophores. Since white LEDs consume considerably less power compared to conventional illuminants and have significantly longer life times, there is particularly intensive work on the optimization of these systems. In addition to interior and exterior lighting, there are numerous promising fields of use as front and rear lights of automobiles, as light sources in liquid-crystal visual display units or as components in plasma visual display units.

The luminophores provided to date are usually crystalline. The luminescent properties desired are obtained through exchange of ions present in the crystalline lattice of the substances for other ions, so-called activators. In this case, the particular crystalline matrix must contain particular cations at defined lattice sites. These cations and their lattice sites must be such that they meet the chemical and structural requirements of the activator ion and hence permit a corresponding substitution. This prerequisite is very restrictive in that a specific host structure has to be found for each activator ion. Owing to an unavoidable mismatch of anions to be substituted and activator ions, the achievable dopant concentrations are additionally limited. In particular, aliovalent doping simultaneously forces electronic defects which have an adverse effect, inter alia, as a result of extinguishment or attenuation of phosphorescence. An additional adverse consequence of the use of crystalline matrices is that, in the case of a desired broad emission, for example of white light through combination of green, red and blue emissions, two and more different luminophores have to be used, which significantly increases manufacturing complexity and costs. Moreover, a common feature of all luminophores described to date is that they are prepared by means of solid-state reactions under extremely temperature conditions and in some cases also pressure conditions (temperatures up to 1900° C.). In addition to the increased energy consumption impurities from the starting compounds, as a result of attacks on the crucible material, have an adverse effect, and cannot be removed by any kind of purifying operations. Impurities give rise to very adverse effects especially in the case of optical materials: in the case of luminophores, they impair the efficiency thereof, because they reduce the optical transparency and simultaneously promote nonradiative decay.

It was an object of the present invention to overcome the outlined disadvantages of the prior art. More particularly, a thermally and chemically resistant matrix was to be provided, into which activators can be introduced universally as desired. In addition, the preparation route was to permit a high purity of the product.

This object is achieved in accordance with the invention by luminophores based on an amorphous or partly crystalline network, the network comprising nitrogen (N) and at least two elements selected from P, Si, B and Al, and at least one activator being incorporated into the network.

DETAILED DESCRIPTION

The inventive luminophores are notable especially in that they are not substances based on a crystalline structure but rather substances based on an amorphous or partly crystalline network. The base materials used in accordance with the invention to form the luminophore have networks which are especially X-ray-amorphous, which means that they comprise no crystals having a diameter of $\geq 300$ nm, especially no crystals having a diameter of $\geq 200$ nm, and even more preferably no crystals having a diameter of $\geq 100$ nm. The base material of the inventive luminophores thus, more particularly, has no long-range lattice symmetry whatsoever. In the inventive luminophores, at least one activator is additionally incorporated into the network of the base material. In contrast to conventional crystalline luminophores, there is no exchange of ions present beforehand in the base material for activators, but rather the activators are incorporated additionally. This brings the significant advantage that any activators can be incorporated into the same matrix, and it is thus possible to provide luminophores which contain different activators. This makes it possible to match and mix the wavelengths of the light emitted over wide ranges and especially also to provide luminophores which emit white light.

The base material of the inventive luminophores, which has an amorphous or partly crystalline network, comprises at least two elements selected from P, Si, B, Al and, independently thereof, always N. More particularly, the network consists of the elements P, Si, B, Al and N, or the particular subsystems of P, Si, B and N, P, Si, Al and N, Si, B, Al and N, P, B, Al and N, P, Si and N, P, B and N, P, Al and N, Si, B and N, Si, Al and N or B, Al and N. Suitable activators are incorporated into this network. The activators introduced into the inorganic amorphous or partly crystalline network may especially be any metal ions. Preferred activator elements are Ba, Zn, Mn, Eu, Ce, Pr, Nd, Sm, Tb, Dy, Ho, Er, Tm, Yb, Sn, Sb, Pb or Bi. The activators are preferably $Mn^{2+}$, $Zn^{2+}$, $Ba^{2+}$, $Ce^{3+}$, $Nd^{3+}$, $Eu^{2+}$, $Eu^{3+}$, $Gd^{3+}$, $Tb^{3+}$, $Sn^{2+}$, $Sb^{3+}$, $Pb^{2+}$, or $Bi^{3+}$. The amount of activators in the luminophore is preferably $\geq 0.1\%$ by weight, especially $\geq 0.5\%$ by weight, and preferably up to 14% by weight, especially up to 5% by weight. The activators may also have a sensitizer function.

More preferably in accordance with the invention, suitable activators are incorporated into an amorphous three-dimensional network of the Si/B/N composition. This host material has no periodic lattice symmetry whatsoever.

Owing to advantageous effects on the crystal field strengths for the activators and in order to achieve a high mechanical and thermal stability, the base material structure is preferably of nitridic nature, which may optionally be doped oxidically.

The invention further relates to a process for preparing luminophores as defined above, comprising the steps of (i) providing one or more molecular precursors, (ii) processing the molecular precursor(s) to a preceramic material, and (iii) pyrolyzing the preceramic material to form an amorphous or partly crystalline network, which is characterized in that at least one activator is added in at least one of steps (i), (ii) or (iii).

The base material is obtainable exclusively via molecular or polymeric precursors which are processed to a preceramic material which is then converted by pyrolysis to the final ceramic state.

The three-dimensional network which is formed from tetrahedral $SiN_4$ units and trigonal-planar $BN_3$ units in the case of $Si_3B_3N_7$ obviously does not offer any means whatsoever of cation substitution (Si, B) by the customary activators (e.g. lanthanoids). Nonetheless, it has been found that, surprisingly, when suitable preparative chemistry measures are taken, doping elements can additionally (not by way of substitution) be bound firmly into the rigid network.

According to the invention, one or more molecular precursors are first provided. The molecular precursors contain the elements of the base material, i.e., more particularly, at least two elements selected from P, Si, B and Al. The concentrations of P, Si, B, Al are each set between 0 and 100 atom %, preferably between 10 and 80 atom %. The molecular precursors are more preferably halides, preferably chlorides.

It is possible to use, as the starting material, a plurality of molecular precursors, especially a mixture of molecular precursors, which are then subjected to a co-ammonolysis. Mixtures of molecular precursors can be obtained, for example, by mixing a silazane and a boron halide and/or phosphorous halide.

In a further embodiment, a molecular precursor is used, which is a one-component precursor. Such a one-component precursor already contains all elements of the amorphous or partly crystalline network. More preferably, the starting point used for the preparation is the molecular compound $Cl_3Si(NH)BCl_2$ (TADB), which already contains the Si—N—B linkage desired in the end product.

Further preferred molecular one-component precursors are $Cl_4P(N)(BCl_2)$ $SiCl_3$, $Cl_3PNSiCl_3$, $(Cl_3Si)_2NBCl_2$, $Cl_3SiN(BCl_2)_2$, $(H_3Si)_2NBCl_2$, $Cl_3Si(NH)(BCl)$ $(NH)SiCl_3$, $Cl_3Si(NH)(AlCl)(NH)SiCl_3$, $[(Cl_3Si)(NH)(BNH)]_3$, $(Cl_3Si(NH)AlCl_2)_2$ or $[Cl_3PN(PCl_2)_2N]^+]AlCl_4]^-$.

The precursor material is then processed in step (ii) to a preceramic material.

Ammonolysis preferably provides a soluble or meltable intermediate or an insoluble and unmeltable amorphous intermediate. The intermediate is subsequently pyrolyzed, preferably in an ammonia or nitrogen stream. To prepare the inventive luminophores, an activator is added in at least one of steps (i), (ii) or (iii). The activators are preferably introduced via the two different routes described below.

Those metals which, like europium or barium, dissolve in liquid ammonia are initially charged dissolved in liquid ammonia, and the molecular precursor, e.g. TADB, is added dropwise. Conversely, it is also possible to add the solution of the metals in ammonia dropwise to initially charged precursors, e.g. TADB. The polymeric imide amide formed contains, as well as the base material elements, for example as well as silicon and boron, also the activator element(s) in homogeneous distribution. The ceramic illuminant is obtained therefrom by pyrolysis.

Activators which do not dissolve in liquid ammonia in elemental form can be introduced in the form of complex molecule compounds. The ligands used should preferably contain only elements inherent to the system, such as halide (chloride), hydrogen, silicon or boron. All other elements would be removable from the end product only with additional complexity, if at all. In some embodiments, the ligands of the complexed activator comprise only those elements extraneous to the system which can be driven out under the conditions of the preparation process. In certain embodiments, the ligands include $(Cl_3SiNSiCl_3)^-$, $(Cl_3SiNBCl_2)^-$, $(Cl_2BNBCl_2)^-$, $[Cl_3SiNSi(CH_3)]^-$, $[(CH_3)_3SiNSi(CH_3)_3]^-$, $[Cl_3SiNB(CH_3)_2]^-$, $[(CH_3)_3SiNBCl_2]^-$, $[Cl_2BNB(CH_3)_2]^-$, $[(CH_3)_3SiNB(CH_3)_2]^-$, $[(CH_3)_2BNB(CH_3)_2]^-$, , or a combination thereof. In one embodiment, the ligands contain —Si$(CH_3)_3$ radicals. In some embodiments, the activator complexes comprise P-containing ligands. Particularly suitable and system-compatible are metal complexes which have, for example, $[Cl_3Si(N)SiCl_3]^-$ and chloride as ligands. Since all metals possible as activators form binary chlorides from which the desired complexes can be prepared by reaction with $Li[Cl_3Si(N)SiCl_3]$, this route is universal. The complexes of the activators are dissolved in the molecular precursor, for example in TADB, or, if appropriate, dissolved in a suitable solvent together with the molecular precursor, for example with TADB. For the purpose of ammonolysis, this mixture or solution is added dropwise to liquid ammonia, or vice-versa.

In general, the preceramic intermediate material, which is especially a preceramic imide amide, is prepared by ammonolysis of molecular precursors containing P, Si, B and/or Al, and of activators. In this ammonolysis or co-ammonolysis, the activators are preferably present in the form of halides or in the form of complexes or in the form of metals dissolved in ammonia. The activators and the molecular precursors may be dissolved in one another or together in a suitable solvent.

The molecular one-component precursor comprises preferably two or more of the elements P, Si, B and Al.

Overall, the starting materials are preferably selected such that elements of ligands of the complexed activator and elements of the molecular precursors with the exception of the elements intrinsic to the preceramic polymer system, especially with the exception of nitrogen, can he driven out completely in the course of the ammonolysis and of the subsequent pyrolysis.

Particular preference is given to the following variants of the preparation. The molecular precursor is added dropwise in pure or dissolved form to liquid ammonia, the ammonia containing dissolved activators, for example europium or barium. Alternatively, the molecular precursor is added dropwise to liquid ammonia for the ammonolysis together with one or more activator elements in the form of halides, in the form of a mixture or dissolved together. In a further preferred embodiment, the molecular precursor is added dropwise to liquid ammonia for the ammonolysis together with one or more activator elements in the form of a complex, in the form of a mixture or dissolved together. Further preferably, the molecular precursor and a halide of each of the activator element(s) in a homogeneous mixture or dissolved together are ammonolyzed with gaseous ammonia. It is additionally preferred to ammonolyze the molecular precursor and a complex of each of the activator element(s) with gaseous ammonia in a homogeneous mixture or dissolved together.

The formation of a preceramic material is followed, in accordance with the invention, by a pyrolysis to form an amorphous or partly crystalline network. In this pyrolysis, the preceramic imide amide obtained as an intermediate is converted to the end product at temperatures between 600° C. and 1500° C., preferably between 1000° C. and 1300° C. The pyrolysis preferably takes place in an atmosphere comprising nitrogen, argon, ammonia or mixtures thereof.

A fine adjustment of the ligand field and hence of the electronic transitions on the activator element is possible through partial substitution of nitride for oxide. This can be achieved, for example, quite simply by exposing the preceramic polymer to a gas atmosphere laden with a defined amount of steam.

The controlled hydrolysis of the preceramic imide amide preferably produces, after the pyrolysis, an end product which contains up to 20% by weight, preferably up to 10% by weight, especially up to 6% by weight, of oxygen, preferably up to 4% by weight of oxygen. However, it is also possible to provide low-oxygen or oxygen-free networks with a content of oxygen of $\leq 1\%$ by weight, especially $\leq 0.1\%$ by weight and most preferably $\leq 0.01\%$ by weight.

Since all feedstocks (e.g. TADB, metals, metal chlorides, ammonia) can be purified effectively by distillation or are available in high purity, contamination with substances extraneous to the system can be ruled out. Preference is given to maintaining inert conditions over the entire preparation process. The pyrolysis is effected, for example, preferably in pure BN crucibles. As a result, the products obtainable are free of detectable impurities. They are also monophasic.

The simultaneous incorporation of two or more activators is possible in accordance with the invention. This allows, for example, the two routes presented above to be taken individually or in combination. For example, two or more metals suitable as activators can be dissolved in liquid ammonia or be introduced as complexes in solution with TADB or either dissolved in liquid ammonia or in solution with TADB.

The luminophores can be applied according to the prior art, for example dispersed in a resin. Advantageously, in the novel system presented here, the sinterability of the polymeric preceramic precursor can be exploited. The preceramic polymer is slurried or dusted onto the surface to be coated and then baked.

The novel luminophores are thermally stable up to at least 1200° C., i.e. much higher than required for use in LEDs (max. 200° C.). By means of chemical analysis (digestion, ICP-OES), no impurities are detectable, at a detection limit of 0.5 ppm. The novel luminophores are suitable especially for use in illumination systems, LEDs or electronic visual display units.

The invention is illustrated in detail by the examples below.

All synthesis steps described in examples 1 to 3 are effected in inert atmosphere, either in a glovebox or by means of Schlenk technology. The ceramic illuminants are air-insensitive.

EXAMPLE 1

$Si_3B_3N_7$: Eu 0.51 g of freshly distilled europium is dissolved in 500 ml of liquid $NH_3$. 50 ml of TADB were added dropwise at −78° C. to the solution obtained with stirring. The mixture of salt (predominantly $NH_4Cl$) and partly crosslinked imide amide obtained was kept at 210° C. for one day under reduced pressure ($p\approx 10^{-3}$ mbar), in order to drive out their $NH_4Cl$ by-product. The polymer which is virtually salt-free thereafter was heated, in a BN crucible baked out at 600° C., first to 900° C. in an $NH_3$ steam then at 1200° C. in an $N_2$ stream (heating range 10° C./m in), and, after a hold time of 3 h, cooled at the same rate. The product is X-ray-amorphous. The chemical analysis (ICP-OES) gave a content of 1.2% by weight of Eu.

EXAMPLE 2

$Si_3B_3N_7$: Ce 1.69 g of $Ce[N(Si(CH_3)_3)_2]_3$ were first added to 50 ml of TADB and then 250 ml of liquid $NH_3$ were added dropwise to this mixture at −78° C. The salt was removed from the mixture of salt (predominantly $NH_4Cl$) and partly crosslinked imide amide obtained by heating under reduced pressure to 210° C. for the duration of one day. The remaining virtually salt-free polymer was heated, in a BN crucible baked out at 600° C., first to 900° C. in an $NH_3$ stream, then to 1200° C. in an $N_2$ stream (heating range 10° C./min), and, after a hold time of 3 h, cooled at the same rate. The product is X-ray-amorphous and contains, after chemical analysis (ICP-OES), a content of 0.92% by weight of Ce.

EXAMPLE 3

$Si_3B_3N_7$: $Ce^{3+}$/Eu

First 0.75 g of $Eu[N(Si(CH_3)_3)_2]_3$ and 0.75 g of $Ce[N(Si(CH_3)_3)_2]_3$ were added to 50 ml of TADB and 250 ml of liquid $NH_3$ were added dropwise to this mixture at −78° C. The salt was removed from the mixture of salt (predominantly $NH_4Cl$) and partly crosslinked imide amide obtained by heating under reduced pressure to 210° C. for the duration of one day. The remaining virtually salt-free polymer was heated in a BN crucible baked out at 600° C., first to 900° C. in an $NH_3$ stream, then to 1200° C. in an $N_2$ stream (heating rate 10° C./min), and, after a hold time of 3 h, cooled at the same rate. The product is X-ray-amorphous and contains, after chemical analysis (ICP-OES), a content of 0.5% by weight of CE and 0.7% by weight of Eu.

The invention claimed is:

1. A luminophore comprising (i) an amorphous or partly crystalline network, and (ii) at least one activator which is incorporated into said network, wherein said network consists of N, at least two elements selected from the group consisting of P, Si, B and Al, and optionally O, wherein said network has an oxygen content of $\leq 1\%$ by weight, and wherein said partly crystalline network comprises no crystals having a diameter of $\geq 100$ nm.

2. The luminophore of claim 1, wherein the activator is selected from the group consisting of Ba, Zn, Mn, Eu, Ce, Pr, Nd, Sm, Tb, Dy, Ho, Er, Tm, Yb, Sn, Sb, Pb and Bi.

3. The luminophore of claim 1, wherein the network is prepared via a preceramic polymer.

4. The luminophore of claim 2 based on a network of the Si/B/N composition.

5. A process for preparing luminophores of claim 1, comprising the steps of
   (i) providing one or more molecular precursors,
   (ii) processing the molecular precursor(s) to a preceramic material, and
   (iii) pyrolyzing the preceramic material to form an amorphous or partly crystalline network, wherein at least one activator is added in at least one of steps (i), (ii) or (iii).

6. The process as claimed in claim 5, wherein the molecular precursor provided is a one-component precursor.

7. The process of claim 6, wherein the molecular one-component precursor is selected from the group consisting of $Cl_3Si(NH)BCl_2$ (TABD), $Cl_3PNSiCl_3$, $Cl_4P(N)(BCl_2)SiCl_3$, $(Cl_3Si)_2NBCl_2$, $Cl_3SiN(BCl_2)_2$, $(H_3Si)_2NBCl_2$, $Cl_3Si(NH)(BCl)(NH)SiCl_3$, $[(Cl_3Si)(NH)(BNH)]_3$, $Cl_3Si(NH)(AlCl)(NH)SiCl_3$, $(Cl_3Si(NH)AlCl_2)_2$ and $[Cl_3PN(PCl_2)_2N]^+[AlCl_4]^-$.

8. The process of claim 5, wherein the molecular precursor(s) are converted to a preceramic material in step (ii) by performing an ammonolysis.

9. The process of claim 5, wherein the activator is used in metallic form, as a halide or/and as a complex.

10. The process of claim 9, wherein the ligands of the complexed activator consist exclusively of elements intrinsic to the preceramic polymer system.

11. The process of claim 10, wherein the ligands are selected from the group consisting of $(Cl_3SiNSiCl_3)^-$, $(Cl_3SiNBCl_2)^-$ and $(Cl_2BNBCl_2)^-$.

12. The process of claim 9, wherein the ligands of the complexed activator comprise only those elements extraneous to the system which can be driven out under the conditions of the preparation process.

13. The process of claim 10, wherein the ligands contain —$Si(CH_3)_3$ radicals.

14. The process of claim 10, wherein activator complexes comprising the $[Cl_3SiNSi(CH_3)]^-$, $[(CH_3)_3SiNSi(CH_3)_3]^-$, $[Cl_3SiNB(CH_3)_2]^-$, $[(CH_3)_3SiNBCl_2]^-$, $[Cl_2BNB(CH_3)_2]^-$, $[(CH_3)_3SiNB(CH_3)_2]^-$ or $[(CH_3)_2BNB(CH_3)_2]^-$ ligands are used.

15. The process of claim 9, wherein activator complexes comprising P-containing ligands are used.

16. The process of claim 5, wherein the molecular precursor and the activator are subjected together to an ammonolysis.

17. The process of claim 16, wherein the ammonolysis is carried out with gaseous or liquid ammonia.

18. The process of claim 5, wherein the pyrolysis in step (iii) is carried out at temperatures between 600° C. and 1500° C.

19. The process of claim 5, wherein the pyrolysis is carried out in a nitrogen, argon or ammonia atmosphere.

20. The process of claim 5, wherein the preceramic material is a preceramic imide amide partly hydrolyzed before the pyrolysis.

* * * * *